3,639,560
VETERINARY TREATMENT
David Martin Moran, Felpham, Bognor Regis, and Jack Vivian Croucher, Crawley, England, assignors to Beecham Group Limited, Brentford, Middlesex, England
Filed July 7, 1970, Ser. No. 52,925
Claims priority, application Great Britain, July 8, 1969, 34,256/69
Int. Cl. A61j 3/02; A61m 3/00; A61k 27/12
U.S. Cl. 424—22
9 Claims

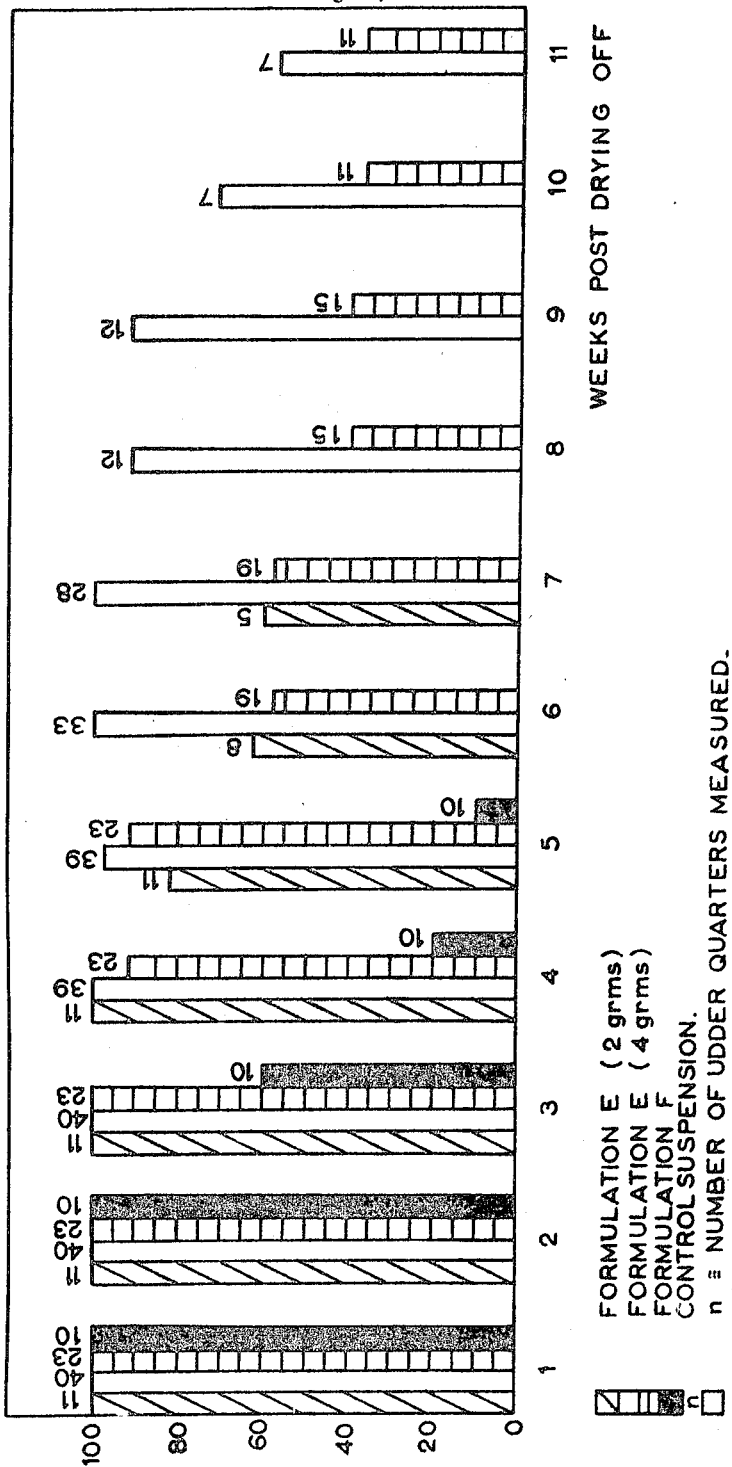

ABSTRACT OF THE DISCLOSURE

Method and composition of sustained release form for treating mammary disorders such as bovine mastitis. Beadlets of 1 to 500 microns in diameter and containing a therapeutic agent are administered during the animal's dry period via the streak canal so that substantially all the therapeutic agent is released in the mammary gland before commencement of the lactation period.

---

This invention relates to a method for the treatment of mammary disorders in animals, especially bovine mastitis.

It is known to use antibiotics and other medicaments in the treatment and control of bovine mastitis. These have previously been administered by the intramammary route and have therefore been used in a liquid or semi-liquid form such as an ointment. In such formulations there is very little control over the rate of release of the active compound into the body of the animal. It is known that the treatment would be more efficient if the therapeutic agent could be released in a controlled fashion and more effective if the duration of activity was extended.

We have now discovered that the therapeutic agent may be administered in such a way as to provide longer retention within the udder.

According to the present invention there is provided a method for the treatment and control of mammary disorders in animals which comprises administering a therapeutic agent to the animal by the intramammary route during the animal's dry period, said therapeutic agent being administered in the form of sustained release beadlets which release the therapeutic agent slowly in the mammary gland over an extended period of time.

The invention is especially applicable in the treatment of bovine mastitis in which the therapeutic agent may be administered directly into the mammary gland via the streak canal.

The formulation of therapeutic agents in the form of sustained release beadlets is well known in the art for oral administration for example, but it has not been suggested that such formulations were suitable for intramammary administration.

The beadlets are preferably of diameter one micron to 500 microns. The therapeutic agent is conveniently dispersed in a matrix of protective material but it may be possible in some cases for particles of therapeutic agent to be encapsulated in protective material or alternatively matrix dispersions may themselves be encapsulated in the same or different protective materials. A wide variety of protective materials may be used as is well known in the art for the primary matrix (U.S. Pat. 2,875,130) for example, wax materials as carnauba wax, montan wax, beeswax, glycerides such as hydrogenated castor oil and hardened lard, and fatty amides such as myristamide and stearamide. Preferably the wax has a melting point above about 50° C. to avoid softening in the udder, but below the decomposition temperature of the active agent to avoid damage during formulation. Preferably also the wax is vegetable-based, is brittle rather than greasy and has a narrow melting range.

The prior formed beadlet may be encapsulated with further protective agents, e.g. waxes with lower melting points than the primary matrix material, denatured proteins and lacquers, so that a more flexible and comprehensive control of the kinetic performance of the product is possible. Examples of further protective agents which are well known in the art are waxes such as paraffin wax and spermaceti wax, proteins such as gelatin, fatty alcohols such as stearyl and cetyl alcohol, glycerides such as glyceryl monostearate and lacquers such as Gelva (Registered Trademark of Monsanto Limited). In order to obtain a uniform sustained release profile, it is well known in the art to employ two or more different sizes of beadlet. Such a device may also be useful on occasions in the present invention.

This invention is primarily applicable in the dry-period therapy in the treatment and control of bovine mastitis. It would clearly be undesirable if the sustained release beadlets continued to release appreciable quantities of therapeutic agent in the mammary gland after the beginning of lactation, since the therapeutic agent would then appear in the milk destined eventually for human consumption. The sustained release beadlets should therefore be formulated in such a way that either they are milked out at the beginning of lactation or alternatively they release substantially all the therapeutic agent before the beginning of lactation. This latter method of ensuring that appreciable quantities of active agent do not appear in the milk is preferred since generally it will be a routine matter to formulate the beadlets accordingly. Local regulations governing the maximum permissible quantity of active agent in the milk, the duration of the cow's dry period and local husbandry practice are all factors which can readily be taken into account when formulating the beadlets.

The beadlets may themselves be suspended in readily emulsifiable oils or water miscible vehicles depending on the stability of the therapeutic agent such that they may be easily introduced into the udder via the intramammary route. If an oil vehicle is employed it should be readily emulsifiable, e.g. by the use of surfactants, in order to avoid beadlet aggregation in the udder. One example of an oily vehicle of the readily emulsifiable type is liquid paraffin thickened with soft white paraffin and lanette wax. Alternatively, the beadlets may be incorporated into a hydrophilic environment such as water gelled with Carbopol 934. In either case, it is found expedient to limit the concentration of the beadlet component such that the proportion of the latter to base vehicle does not exceed unity. The formulation may then be filled into tubes or syringe packs of the conventional type for intramammary administration, i.e. provided with a cannula nozzle fitting such that the suspension may be extruded in the normal manner directly into the mammary gland via the streak canal.

The therapeutic agent may be chosen from a wide range of antibiotics and other compounds known to be effective in the treatment of mammary disorders such as bovine mastitis. Examples of suitable therapeutic agents are cloxacillin, especially benzathine cloxacillin, ampicillin, carbenicillin, neomycin especially the sulphate, streptomycin, novobiocin, tetracycline, chlorotetracycline, oxytetracycline and salts thereof.

The following examples illustrate the present invention. All parts and percentages are by weight unless otherwise specified.

EXAMPLE I

Benzathine cloxacillin is slurried in a melt of hydrogenated castor oil in the proportion of 1 part to 5, this concentration allowing the mixture to flow freely. The slurry is then poured at a controlled rate on to a spinning disc, operating at about 7,000 revs. per minute, and the beadlets of material of diameter in the range 100–500 microns, formed by disruption of the bulk slurry by the centrifugal force, are collected and sieved. The flight path of the particles from the disc to the container walls, the disc speed and the other experimental parameters may be varied according to the properties of the raw component materials being used and the nature of the product required. Further details of the process and its variants may be found in F. E. Massouth et al. I. & E. C. Progress Design and Development April 6, 1965.

Beadlets of benzathine cloxacillin in hydrogenated castor oil (9 gms.) were dispersed in 200 mls. of an aqueous solution at pH 6.5 containing equal concentrations of gelatin and acacia at a 3.0% w./v. level and maintained at 37° C. Whilst maintaining gentle agitation of the suspension, the pH of the aqueous phase was lowered to 4.5 by means of a dropwise addition of hydrochloric acid (1 N). 10 mls. of formaldehyde solution (40% w./v.) were then added to the mixture and the whole cooled to 10° C. The solution was then adjusted to pH 9.0 with sodium hydroxide. This method of preparation is described in L. A. Luzzi and R. J. Gerraughty J. Pharm. Sci. 56 634 1967.

The encapsulated beadlets were washed with isopropyl alcohol and water, centrifuged and finally allowed to dry at room temperature.

The encapsultated beadlets were then dispersed in liquid paraffin containing lanette wax surfactant and filled into a syringe pack which was provided with a cannula nozzle fitting.

It was then extruded directly into the mammary gland of a cow via the streak canal during the animal's dry period.

EXAMPLE II

Benzathine cloxacillin/hydrogenated castor oil beadlets of composition 1 part antibiotic to 5 parts wax were prepared by the method described in Example I.

A weighed amount of beadlets were placed in a reaction vessel containing a measured volume of distilled water and agitated by a uniformly constant end over end rotational motion. The whole system was maintained at a constant temperature of $37 \mp 1°$ C. At given time intervals, the amount of antibiotic released into aqueous solution was determined by standard iodometric titration methods. For comparison, the rate of dissolution of an equivalent amount of unprotected benzathine cloxacillin was also determined. The results are collected in Table 1.

TABLE 1

| | Cloxacillin conc. in solution expressed as a percentage of initial amount added | | | |
|---|---|---|---|---|
| | Benzathine clox/ hydrogenated castor oil beadlets | | Benzathine cloxacillin unprotected form | |
| Time (hrs.) | Run 1 | Run 2 | Run 1 | Run 2 |
| 1 | 1.3 | 2.2 | 79 | 74 |
| 3 | 4.0 | 3.7 | 84 | 82 |
| 5 | 5.2 | 5.7 | 89 | 85 |
| 24 | 14.6 | 13.6 | | |

EXAMPLE III

Protected forms of benzathine cloxacillin, benzathine penicillin 6 and the calcium salts of novobiocin were prepared by the technique described in Example I. The composition of the respective formulations were:

(A)
| | Parts |
|---|---|
| Benzathine cloxacillin | 1 |
| Hydrogenated castor oil | 5 |

(B)
| | |
|---|---|
| Benzathine cloxacillin | 1 |
| Hydrogenated castor oil 75% w./v.; Lanette wax to 100% | 9 |

(C)
| | |
|---|---|
| Benzathine penicillin G | 1 |
| Hydrogenated lard | 9 |

(D)
| | |
|---|---|
| Calcium novobiocin | 1 |
| Hydrogenated lard | 9 |

The release of antibiotic into a sterile milk phase, maintained at $38 \pm 1°$ C., was determined for formulations A, C and D respectively by a similar method to that described in Experiment I. In the above experiment, however, the reaction vessel was agitated by means of a rocking motion. The antibiotic concentrations were determined directly in milk using standard microbiological assay techniques. The results are shown in Table 2.

The release rates of benzathine cloxacillin from formulation B and also A were determined using an aqueous phosphate buffer system, maintained at pH 6.6, by means of the iodometric assay technique indicated previously. Results for the release rates are given in Table 3.

TABLE 2

| | Antibiotic in solution at time $t$ mg./grm. beadlets | | |
|---|---|---|---|
| Time (hrs.) | Formulation A[1] (as benzathine salt) | Formulation C[1] (as benzathine salt) | Formulation D (as calcium salt) |
| 1 | | 0.46 | 0.20 |
| 6 | 8.85 | | |
| 24 | 16.9 | 0.46 | 4.8 |
| 48 | 15.6 | | |
| 72 | 25.7 | 0.26 | 8.2 |
| 168 | 16.9 | 0.12 | 10.2 |
| 240 | 21.5 | | |
| 332 | 12.9 | 0.16 | 9.4 |

[1] The figures quoted do not represent the total amount leached since the antibiotic in solution is subject to hydrolysis.

TABLE 3

| | Antibiotic released total mg./grm. beadlets | |
|---|---|---|
| Time | Formulation A | Formulation B[1] |
| 1 | | 6.3 |
| 2 | | 9.5 |
| 3 | 3.6 | |
| 4 | | 11.5 |
| 6 | | 16.1 |
| 18 | | 22.2 |
| 24 | 19.1 | 35.0 |
| 48 | 21.0 | 46.7 |
| 72 | 24.5 | 60.0 |
| 168 | 38.4 | |
| 240 | 40.9 | |
| 332 | 62.8 | |

[1] Reaction vessel agitated by end over end motion. Further, after 72 hours the antibiotic released represented a complete exhaustion of the formulation.

EXAMPLE IV

To illustrate the persistence characteristic of wax protected antibiotic intrammammary formulations when infused into the lactating udder after the last milking lactations Protected forms of benzathine cloxacillin were prepared by the technique described in Example I. The composition of the respective formulations were:

(E)

| | Parts |
|---|---|
| Benzathine cloxacillin | 1 |
| Hydrogenated lard | 4 |

(F)

| | Parts |
|---|---|
| Benzathine cloxacillin | 1 |
| Paraffin wax | 5 |

Both sustained release formulations were dispersed in a 0.5% w./v. Carbopol 934 aqueous vehicle in appropriate proportions to yield 2 gms. and 4 gms. of the reference E beadlets respectively and 2 gms. of the reference F beadlets per infusion unit. The ratio of beadlets to the infusion vehicle was 0.7 in each cast.

Udder quarters of cows free from clinical mastitis were infused after the last milking of lactation with either an intramammary suspension of the composition described above or alternatively, as a control, a commercially available form of benzathine cloxacillin in a hydrophobic vehicle of 3.0% w./v. aluminium stearate in mineral oil. (Orbenin Dry Cow—Beecham Research Laboratories.) At given intervals during the dry period, 5–8 mls. of secretion were removed from the respective udder quarters to determine the persistency of the antibiotic. Cloxacillin was assayed directly in dry cow secretion using standard microbiological techniques. Natural inhibitory substances were discerned by means of penicillinase treatment.

Results for the longevity of the various preparations are given in Table 4. The persistence characteristics, expressed as a function of the relative dry period duration are illustrated in the accompanying drawing.

TABLE 4

| Formulation | Quantity beadlets infused (gms.) | Number of cows used | Number of qtrs. fused | Avg. persistence (P), weeks | Avg. dry period (DP), weeks | P/×100 DP, percent | Mean of averages of antibiotic, μg./ml. | Range of averages of antibiotic, μg./ml. |
|---|---|---|---|---|---|---|---|---|
| F | 4 | 6 | 23 | 7.6 | 10.3 | 81.0 | 67.5 | 50–165.0 |
| E | 2 | 6 | 24 | 5.8 | 6.7 | 87.5 | 6.0 | 3.6–12.5 |
| E | 4 | 19 | 40 | 7.3 | 7.7 | 95.0 | 88.2 | 6.0–109 |
| Control | | 10 | 10 | 3.1 | 8.7 | 36.0 | 11.9 | 3.0–52.0 |

We claim:

1. A method for the treatment and control of bovine mastitis in lactating female brovine animals which comprises administering an effective bovine mastitis therapeutic agent to the animal by the intramammary route directly into the mammary gland through the streak canal during the animal's dry period after the last milking of lactation, said therapeutic agent being dispersed in a melt of wax in the form of aqueous or emulsifiable oily suspension of wax matrix sustained release beadlets formed 1 to 500 microns in diameter from a melted slurry of vegetable or animal based brittle wax having a narrow melting range above about 50° C., to avoid softening in the udder, but below the decomposition temperature of active ingredient, filled into syringe packs provided with a cannular nozzle fitting for intramammary administration, which beadlets release the therapeutic agent slowly in the mammary gland over an extended period of time and thereby provide longer medicament retention within the udder than liquid or semi-liquid forms of said effective bovine mastitis therapeutic agent administered by said intramammary route.

2. A method as claimed in claim 1 wherein the sustained release beadlets release substantially all of the therapeutic agent in the mammary gland before the commencement of the animal's lactation period.

3. A method as claimed in claim 1 wherein the waxy substance is hydrogenated lard or hydrogenated castor oil.

4. A method as claimed in claim 1 wherein the matrix containing the therapeutic agent is encapsulated with a further protective coating.

5. A method as claimed in claim 1 wherein the waxy matrix containing the therapeutic agent is encapsulated with a second waxy substance of lower melting point than the waxy matrix.

6. A method as claimed in claim 1 wherein the sustained release beadlets are administered in the form of a suspension in an emulsifiable oily vehicle containing an effective amount of surfactant to avoid beadlet aggregation in the udder.

7. A method as claimed in claim 1 wherein the therapeutic agent is a penicillin or a non-toxic salt or ester thereof.

8. A method as claimed in claim 7 wherein the therapeutic agent is benzathine cloxacillin.

9. A syringe pack provided with a cannular nozzle fitting for intramammary administration filled with a therapeutic composition for use in the treatment and control of mammary bacterial infection in animals which comprises a penicillin or a non-toxic salt or ester thereof dispersed in a melt of wax in the form of wax matrix sustained release beadlets formed 1 to 500 microns in diameter from a melted slurry of vegetable based brittle wax having a narrow melting range above about 50° C. to avoid softness in the udder but below the decomposition point of the penicillin, said beadlets being suspended in an aqueous medium or emulsifiable oily vehicle.

References Cited

UNITED STATES PATENTS

| | | | |
|---|---|---|---|
| 2,498,374 | 2/1950 | Martin | 424—271 X |
| 2,507,193 | 5/1950 | Buckwalter | 424—271 |
| 2,584,166 | 2/1952 | Stevenson et al. | 424—271 X |
| 2,661,315 | 12/1953 | Jurist et al. | 424—271 |
| 2,805,977 | 9/1957 | Robinson et al. | 424—22 X |
| 2,902,407 | 9/1959 | Gross et al. | 424—271 X |
| 2,908,609 | 10/1959 | Aterno et al. | 424—114 |
| 3,049,473 | 8/1962 | Beatson et al. | 424—271 X |
| 3,135,658 | 6/1964 | Hanus et al. | 424—271 X |
| 3,144,386 | 8/1964 | Brightenback | 424—271 X |

SHEP K. ROSE, Primary Examiner

U.S. Cl. X.R.

28—221, 264, 348; 424—19, 20, 271